Figure 1:
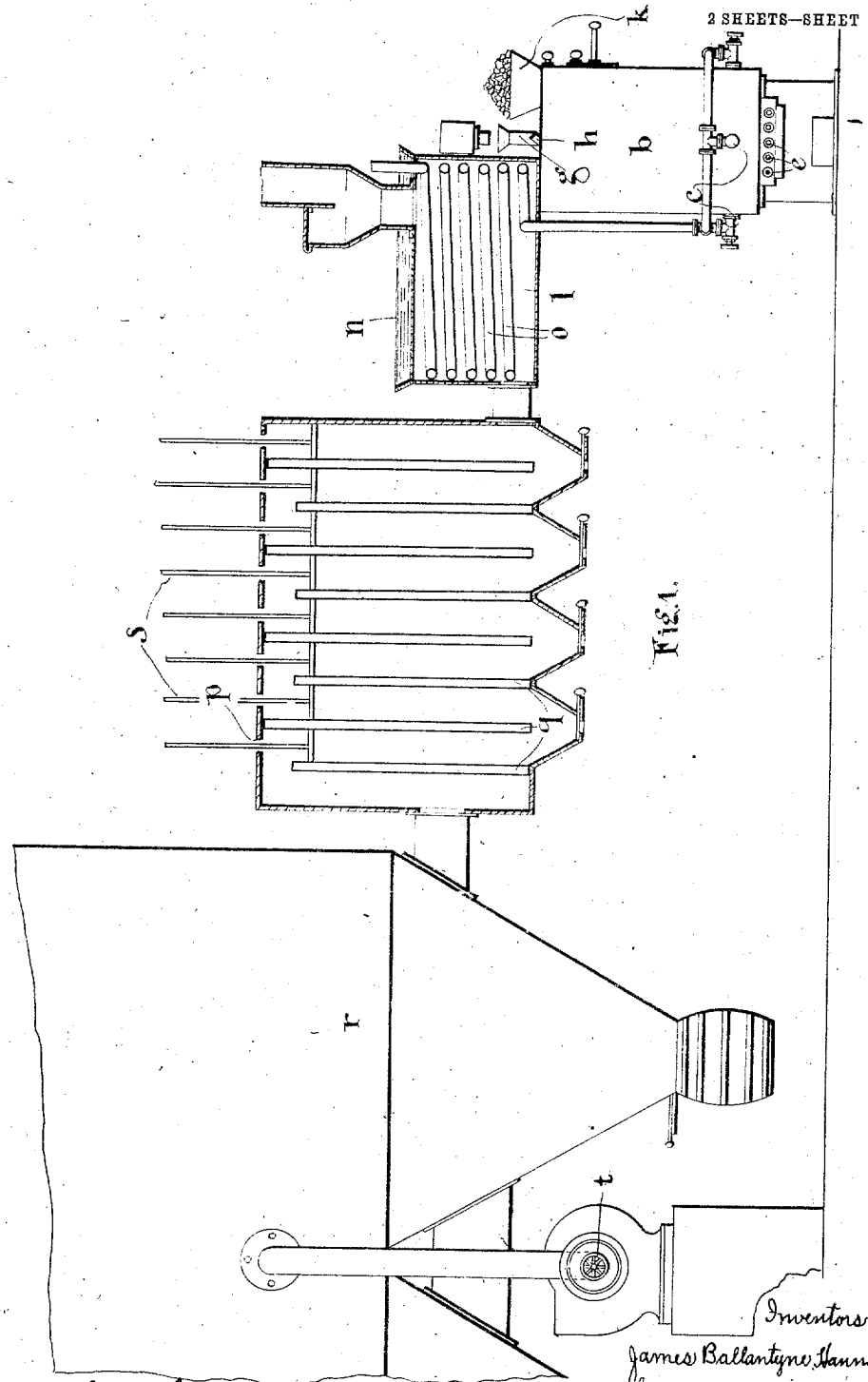

J. B. HANNAY & S. B. WILSON.
MANUFACTURE OF WHITE SULFATE OF LEAD PIGMENT.
APPLICATION FILED MAR. 13, 1909.

955,396.

Patented Apr. 19, 1910.

2 SHEETS—SHEET 1.

UNITED STATES PATENT OFFICE.

JAMES BALLANTYNE HANNAY, OF COVE CASTLE, SCOTLAND, AND SAMUEL BARROW WILSON, OF WESTMINSTER, LONDON, ENGLAND.

MANUFACTURE OF WHITE SULFATE-OF-LEAD PIGMENT.

955,396.  Specification of Letters Patent.  Patented Apr. 19, 1910.

Application filed March 13, 1909. Serial No. 483,109.

*To all whom it may concern:*

Be it known that we, JAMES BALLANTYNE HANNAY, a subject of the King of Great Britain and Ireland, and residing at Cove Castle, in the county of Dumbarton, Scotland, and SAMUEL BARROW WILSON, a subject of the King of Great Britain and Ireland, and residing at 180 Ebury street, in the city of Westminster, London, England, have invented certain new and useful Improvements in the Manufacture of White Sulfate-of-Lead Pigments, of which the following is a specification.

Our invention relates to the manufacture of a white basic sulfate of lead pigment from galena or other sulfid of lead ore by furnacing operations.

According to a known method of operation, air is forced through a column of incandescent coke, thus forming carbonic oxid and the galena introduced into the furnace is vaporized in a carbonic oxid atmosphere, producing at the same time some metallic lead. The volatilized lead sulfid mixed with the hot carbonic oxid is then conducted to a separate chamber or another part of the same chamber and the carbonic oxid is burned to carbonic acid by the admission of air. The high temperature thus produced in presence of excess of air also oxidizes the lead sulfid.

In the above described process owing to the formation of metallic lead and to the deterioration of the color of the formed lead sulfate by contact with carbonic oxid at a temperature so low that oxidation does not again follow, it has not been possible to produce a yield of more than 80% and that not always a good color.

It has also been proposed to submit the ore with coke and a suitable flux to the action of a cold or hot air blast and to further oxidize the fumes produced in a reverberatory chamber by means of added air or by means of nitrous vapor, but in such process a quantity of pig lead is formed and the sulfate produced contains various products of subsidiary oxidizing and reducing reactions which give it a gray or yellow color and also give the sulfate such physical properties that it is unsuitable for use as a pigment and also requires chemical purification.

It has further been proposed to utilize a hot air blast obtained by regeneration, with gaseous fuel at a pressure of 60 lbs. in a furnace to produce white sulfate of lead from galena, but in such process a considerable quantity of pig lead is produced and it is impossible to obtain a product suitable in color and physical properties for use as a pigment.

According to another method, the sulfid of lead is entirely converted to a basic sulfate within the furnace by means of excess of oxygen. In this process no reducing gases leave the furnace unburned.

According to another process the sulfid of lead is converted first to sulfite, and the completion of the conversion into lead sulfate is effected by treatment with nitric acid.

In all the above processes it has been impossible to obtain a yield greater than about 80% of white lead sulfate and the color of the product has been extremely unreliable owing to various subsidiary oxidations and reductions taking place in different parts of the furnace and combustion chamber during the process.

The object of our invention is to produce white pigment consisting entirely of a basic sulfate of lead and to so carry out the process that the product obtained is of a uniform white color.

The product obtained according to the preferred form of our process consists entirely of basic sulfates of composition between $3PbSO_4.PbO$ and $2PbSO_4.PbO$; if the composition of the basic sulfate is between these limits, we find that a good white pigment is produced whereas when the proportion of oxid of lead is less the pigment obtained is of very gray color, and if the proportions of $PbSO_4$ is less, a yellow color is obtained.

Our invention consists in an improved process for the production of a white basic sulfate of lead pigment from galena by furnacing operations in which the sulfid of lead is fed on to the top of fuel in a furnace to which a hot air blast is supplied, the sulfid being carried from the furnace in an atmosphere practically deprived of active oxygen at an extremely high temperature so that the liquid and solid sulfid is protected from reducing action by its own vapor and also by the atmosphere of inert gases.

The invention further consists in oxidizing the sulfid of lead passing from the furnace and forming basic sulfate in a combustion chamber by the admission of large excess of cold air, and in rapidly cooling the basic sulfate formed, so that subsidiary and accidental reductions and oxidations are prevented.

The invention further consists in so controlling the furnacing operations that a continuous uniform production of basic sulfate between the limits 3PbSO₄PbO and 2PbSO₄PbO is maintained.

The invention also consists in the improved process for the manufacture of a white basic sulfate of lead pigment hereinafter described.

By our improved process the formation of pig lead or colored pigments by fortuitous reduction or oxidation of the ore is entirely avoided, and the basic sulfate formed is preserved from any chance reduction or oxidation after its formation by the rapid cooling which takes place when the required oxidation is complete. The apparatus is so designed that the process is continuous and the balance of flame temperatures through the furnace is not disturbed by the feed of fuel or ore, or by cleaning operations. In all previously known processes the balance of flame temperature has been disturbed for some or all these purposes involving the formation of other products than the required basic sulfate of lead and giving a bad color and undesirable physical properties to the pigment.

According to our improved process the carbonic oxid atmosphere which is produced and exists both in and above the coke is very much hotter than has been the case in previous processes, the temperature in the coke being 1550° C., and at the top of the furnace about 1250° C., that is, about 200° C. higher than has been heretofore used. In consequence of the high temperature, the melted globules of galena resting on the coke are each surrounded in the furnace by an atmosphere of lead sulfid so that liquid and solid galena which alone can form pig lead are protected from the action of any remaining trace of oxygen in the practically inert gases. As a further consequence of the higher temperature used in the improved process, the rate of volatilization is considerably increased so that a furnace of 36 inches internal diameter will deal with 4 tons of lead sulfate in 24 hours as compared with 30 cwts. which could be dealt with in a furnace of the same size working according to the known processes in which carbonic oxid is used.

Figure 2:
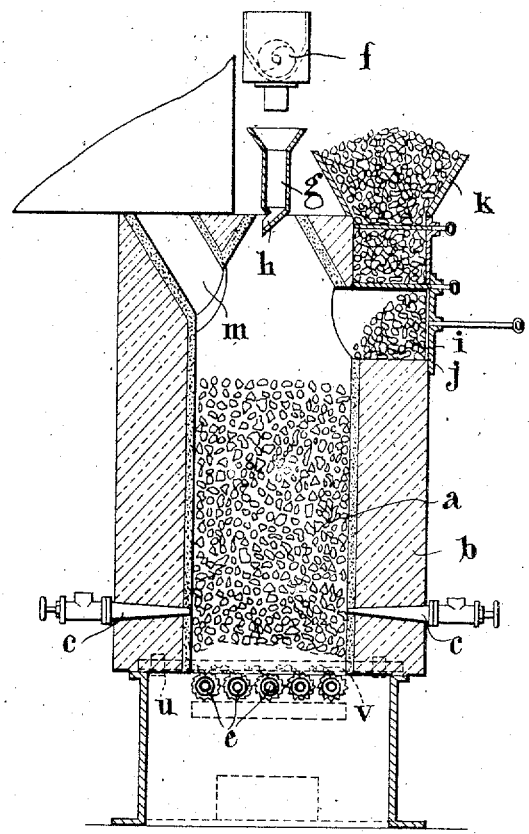
Figure 3:
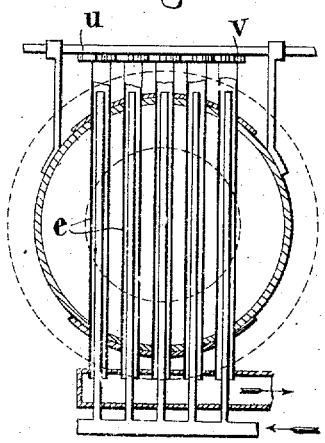

Referring to the accompanying diagrammatic drawings: Figure 1 is a general view of the apparatus; Fig. 2 is a sectional elevation of the furnace while Fig. 3 is a plan of the bottom of the furnace.

In carrying the invention into effect in the apparatus illustrated, we introduce the galena on to the top of the coke, a, in a furnace, b, provided with twyers, c, by which hot air is supplied, the hot air being preferably heated by regeneration from the combustion chambers, l, hereinafter described. The furnace, b, which should be of considerable depth and should be lined with magnesia is provided at its bottom with rotating water cooled fire bars, e, rotated by the reciprocating rack, u, actuating ratchets, v, so that ash is automatically removed from the furnace and can be cleared away at the bottom without in any way interfering with the normal circulation of the gases and vapors therein. The ore is carried to the furnace by a conveyer and after drying is forced by the feed screw, f, into a funnel g, rotating about a vertical spindle. The lower end, h, of the funnel is of a spherical spoon shape and delivers the ore into the furnace at an angle with the vertical, and a jet of air may be employed to insure that the ore if in powder shall be properly distributed over the coke and shall not form a solid mass in the center of the furnace. The pressure of the air may be varied to suit the varying quantities of fine powder in the ore. This air is preferably heated by waste heat from the combustion chamber hereinafter described. In any case we find it desirable to admit a small quantity of air at the apex of the arch of the furnace so as to burn a portion of the carbonic oxid and so maintain the temperature of the volatilized mixture until the vapors pass into the main combustion chamber. The coke is fed into the furnace from a hopper k, which opens when required into an inclosed box, j, nearly level with the live coke surface and open to the heat from the coke furnace, and when sufficiently heated is pushed in by means of a horizontal pusher, j, so that no cold fuel is fed into the furnace. Carbonic oxid is formed by the action of the coke on the air passing through it, and carries over the volatilized lead sulfid into a combustion chamber, l, where a large excess of cold air meets the mixed carbonic oxid and sulfid of lead vapor. A rapid oxidation of the lead sulfid and carbonic oxid ensues, and the air is admitted in sufficient quantity that cooling takes place immediately on the completion of the oxidation. The flue m leading from the furnace to the combustion-chamber l, is preferably lined with magnesia, the air in the combustion chamber is added cold in order to reduce temperature rapidly; considerable cooling action being required owing to the high heat or formation of the lead sulfate. The combustion chamber is formed of thin metal and has a water cooled top n to obtain rapid cooling and is provided with a number of passages, o, through which air circulates on its way to the twyers, c, of the furnace so that the heat evolved by the reaction in the combustion chamber is as much as possible transferred to the ingoing air. From the air cooling and combustion chamber the basic lead sulfate now in the form of white smoke, passes to a water cooler, $p$, where it travels up and down between hollow diaphragms, $q$, containing water, and is thereby further cooled, scrapers $s$ being provided for ——ping off any powder which may be deposited on the surface of the water chambers. The lead fume passes from the water cooler to a condenser $r$. For the purpose of preventing choking of the passage leading to the condenser this may be modified by providing a clear space between the condenser proper and the conical hoppers into which the condensed powder falls. From the hoppers the condensed powder is run into receptacles in the usual manner. The whole of the air required is preferably drawn through the apparatus by means of a fan $t$ situated beyond the condensers and for regular production of the basic white lead sulfate of the composition required a vacuum of $\frac{1}{2}''$ to $1''$ of water in the furnace may be conveniently used.

By the use of the hot air supply as above described the galena is volatilized in the upper part of the coke at a short distance from the surface practically all the oxygen admitted being taken up by the carbon at the lowest layers of coke, so that only neutral gases at a white heat reach the zone in the furnace to which the galena falls. There is thus obtained true volatilization of the galena and no smelting.

It is of the greatest importance that the operation of the furnace should be uniform, and that the flame temperature should be kept as constant as possible and according to our invention this is effected by the use of a furnace which need not be opened or need only be opened at long intervals for repairs. The feeding of ore and fuel and the clearing of the grate does not in any way interfere with the quantity of air drawn through and cannot cause admission of cold air to the furnace so that a uniform continuous reaction takes place. By reason of the continuous working the yield of the plant is considerably increased.

The high temperature the silicate of lead slag formed from the ash of the coke is robbed of its lead, all the lead being volatilized. If an ore containing only silica as gangue is used a little lime is added from time to time with the coke so as to insure the total volatilization of the lead so that the slag or cinder consists only of silicate of lime and avoids all loss of lead.

By our improved process we have been able to obtain from 100 parts of lead sulfid ore containing about 5% of impurities, 111 parts of basic sulfate of a composition between $3PbSO_4.PbO$ and $2PbSO_4.PbO$ so that allowing for the impurities in the ore a practically theoretical yield of pigment is obtained, also by reason of the increased rapidity of volatilization the output of a given furnace in a given time is largely increased, while the product is in a state ready for immediate use and requires no washing or purification of any kind.

Having now described our invention what we claim as new and desire to secure by Letters Patent is:—

1. A process for the production of a white sulfate of lead pigment from galena which consists in feeding galena on to the top of fuel in a furnace, supplying a hot air blast to the furnace, causing the formed sulfid to be carried from the furnace in an atmosphere deprived of active oxygen at an extremely high temperature and oxidizing by admission of air to form sulfate of lead, as set forth.

2. A process for the production of a white sulfate of lead pigment from galena consisting in heating the sulfid in an inert atmosphere in a furnace, carrying the sulfid from the furnace in an inert atmosphere to a combustion chamber and oxidizing to form basic sulfate by the admission of a large excess of cold air and rapidly cooling the basic sulfate formed, as set forth.

3. A process for producing white sulfate of lead pigment from galena which consists in feeding galena on to the top of fuel in a furnace, supplying a hot air blast to the furnace, causing the formed sulfid to be carried from the furnace in an atmosphere deprived of active oxygen at an extremely high temperature and oxidizing by admission of air to form sulfate of lead and feeding coke, galena and hot air to the furnace without disturbing temperature conditions, as set forth.

4. A continuous process for producing a pigment of basic sulfate of lead of composition between $3PbSO_4.PbO$ and $2PbSO_4.PbO$, consisting in feeding galena on to the top of fuel in a furnace, supplying a hot air blast to the furnace, causing the formed sulfid to be carried from the furnace in an atmosphere deprived of active oxygen at an extremely high temperature and oxidizing by admission of air to form sulfate of lead, as set forth.

In testimony whereof we affix our signatures in presence of two witnesses.

JAMES BALLANTYNE HANNAY.
SAMUEL BARROW WILSON.

Witnesses:
ALBERT E. PARKER,
GEORGE I. BRIDGES.